Feb. 20, 1945.  A. MONTALBANO  2,369,973

FLY-CAST FISHING BOAT

Filed May 11, 1943

Anthony Montalbano
INVENTOR.

BY
Victor J. Evans & Co.
ATTORNEYS

Patented Feb. 20, 1945

2,369,973

UNITED STATES PATENT OFFICE 2,369,973

FLY-CAST FISHING BOAT

Anthony Montalbano, Baton Rouge, La.

Application May 11, 1943, Serial No. 486,549

4 Claims. (Cl. 115—26)

My invention relates to boats, and has among its objects and advantages the provision of an improved fly-cast fishing boat designed for propulsion by foot power, with the drive so arranged as to permit one or two persons to operate the drive.

Figure 1:
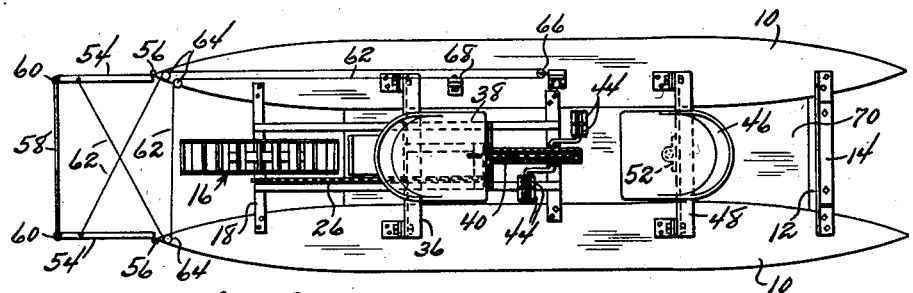
Figure 1 is a top view.
Figure 2:
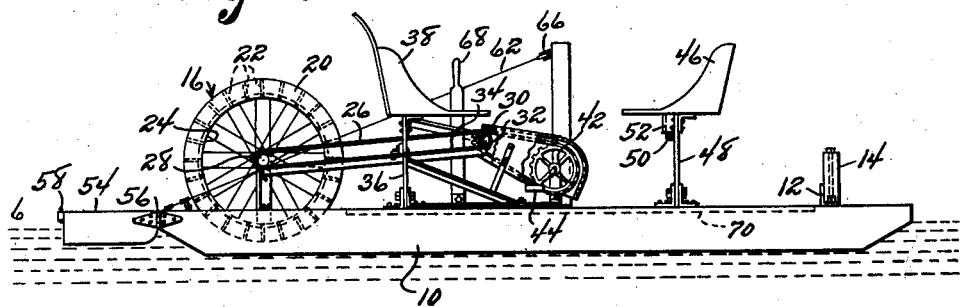
Figure 2 is a side view with a chain housing partly in section.
Figure 3:
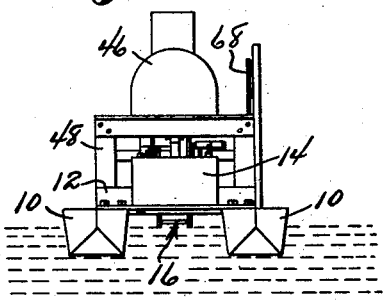
Figure 3 is a front end view.
Figure 4:
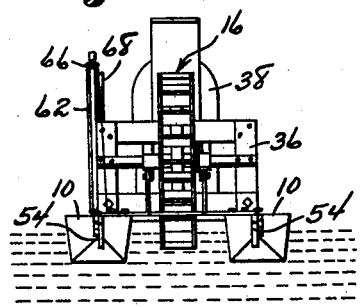
Figure 4 is a rear end view.

In the embodiment of the invention selected for illustration, I make use of two parallel pontoons 10, preferably of hollow and airtight construction. A cross angle 12 is attached to the forward ends of the pontoons and carries a plank 14 which may serve as a mount for a motor of the outboard type. However, the boat is primarily designed for propulsion by foot power. A paddle wheel 16 is rotatably mounted on the pontoons 10 near their rear ends. A supporting frame 18 serves as a mount for the paddle wheel in addition to an interconnection between the two pontoons. This paddle wheel comprises two sheet metal rings 20 between which are arranged metal sheets or paddles 22. These paddles are closely spaced and radially arranged with respect to the axis of the wheel. The paddles 22 are soldered to the rings 20 and the latter are attached to a bicycle rim 24. The rings 20 are preferably spaced 6 inches apart and the paddles 20 are preferably 6 x 3 inches and spaced 3 inches apart. This close spacing of the paddles eliminates noise when propelling the boat at a low speed.

A chain 26 passes around a sprocket 28 on the wheel 16 and around a sprocket 30 attached to a shaft 32 rotatably mounted on an angle frame 34. One end of the frame 34 is attached to the support 18 and its other end is attached to an upright frame 36 on which a chair 38 is mounted.

A chain 40 passes around a sprocket on the shaft 32 and around a large sprocket 42 to which pedals 44 are connected. Two pedals 44 are provided on each side of the sprocket 42 so that two persons may apply power to the sprocket. A chair 46 is mounted forwardly of the sprocket 42 upon a frame 48. This chair is provided with a pivot 50 rotatably mounted in a bearing 52 on the frame 48.

Rudders 54 are respectively hingedly connected with the rear ends of the pontoons 10, as at 56. These rudders are maintained in parallelism through the medium of a rod 58 pivotally connected at its ends with the rear ends of the rudders, as at 60.

Steering lines 62 are respectively attached to the rudders 54 and pass around grooved wheels 64 and around a forward wheel 66. The ends of the lines are connected with a steering lever 68.

The boat is effectively balanced but is of small size and relatively light in weight.

Without further elaboration, the foregoing will so fully explain my invention, that others may, by applying current knowledge, readily adapt the same for use under various conditions of service.

I claim:

1. A boat of the type described comprising parallel pontoons, means fixedly relating the pontoons, a paddle wheel mounted on said pontoons for propelling the boat, a drive for said paddle wheel, said drive including a rotary member provided with dual pedals, and chairs arranged on opposite sides of said member adjacent the pedals, at least one of said chairs being rotatably mounted.

2. In a boat of the character described, a pair of pontoons fixedly related in parallel spaced apart positions, a paddle wheel mounted on said pontoons for propelling the boat, foot operated mechanism for driving said wheel, a seat mounted in position for actuating said foot operated mechanism, and a swivel seat mounted on the forward part of the boat adjacent the foot operated mechanism.

3. In a boat of the character described, a pair of pontoons fixedly related in parallel spaced apart positions, a paddle wheel mounted on said pontoons for propelling the boat, foot operated mechanism for driving said wheel, a seat mounted in position for actuating said foot operated mechanism, an upstanding support mounted on the pontoons in a position intermediate the same, and a seat rotatably mounted on said support adjacent the foot operated mechanism.

4. In a boat of the character described, a pair of elongated pontoons fixedly related in parallel spaced apart positions with their bows and sterns transversely aligned, a paddle wheel mounted on and between said pontoons for propelling the boat a sprocket on said paddle wheel, foot operated mechanism including pedals and a sprocket a chain associated with said sprocket for driving the paddle wheel for actuating the same, a seat mounted in position for actuating said foot operated mechanism, an upstanding support mounted on the pontoons in a position intermediate the same, and a seat rotatably mounted on said support adjacent the foot operated mechanism.

ANTHONY MONTALBANO.